United States Patent [19]
Graf

[11] 3,708,892
[45] Jan. 9, 1973

[54] EDUCATIONAL DEVICE

[76] Inventor: Mary C. Graf, 506 Smith Avenue, Apt. 9A, Lake Bluff, Ill. 60044

[22] Filed: Jan. 27, 1971

[21] Appl. No.: 110,031

[52] U.S. Cl. ..............................................35/31 D
[51] Int. Cl. ............................................G09b 19/02
[58] Field of Search ...35/30, 31 R, 31 B, 31 D, 31 G, 35/32, 34, 69, 70, 72, 73, 1, 21, 23

[56] References Cited

UNITED STATES PATENTS

| | | | |
|---|---|---|---|
| 1,329,850 | 2/1920 | Pye | 35/73 X |
| 3,002,295 | 10/1961 | Armstrong | 35/31 G |
| 2,839,842 | 6/1958 | Keyko | 35/32 X |

FOREIGN PATENTS OR APPLICATIONS

| | | | |
|---|---|---|---|
| 725,755 | 2/1932 | France | 35/31 D |

*Primary Examiner*—Wm. H. Grieb
*Attorney*—Neil E. Hamilton and William A. Denny

[57] ABSTRACT

An educational device which teaches a child mathematical procedures, measurements and proportions including fractions as well as colors by permitting the child to visualize block members of varying dimensions and colors in relation to each other. A post element is secured to a base member and block members are constructed to be inserted on the post so as to permit the child to store the blocks and measure his own height in relation to the base and the block members. The post is detachable and has measuring indicia to allow the child to measure the blocks and the blocks are of varying colors some of which are arranged in sets to equal the base member so as to provide an understanding of fractional amounts.

10 Claims, 4 Drawing Figures

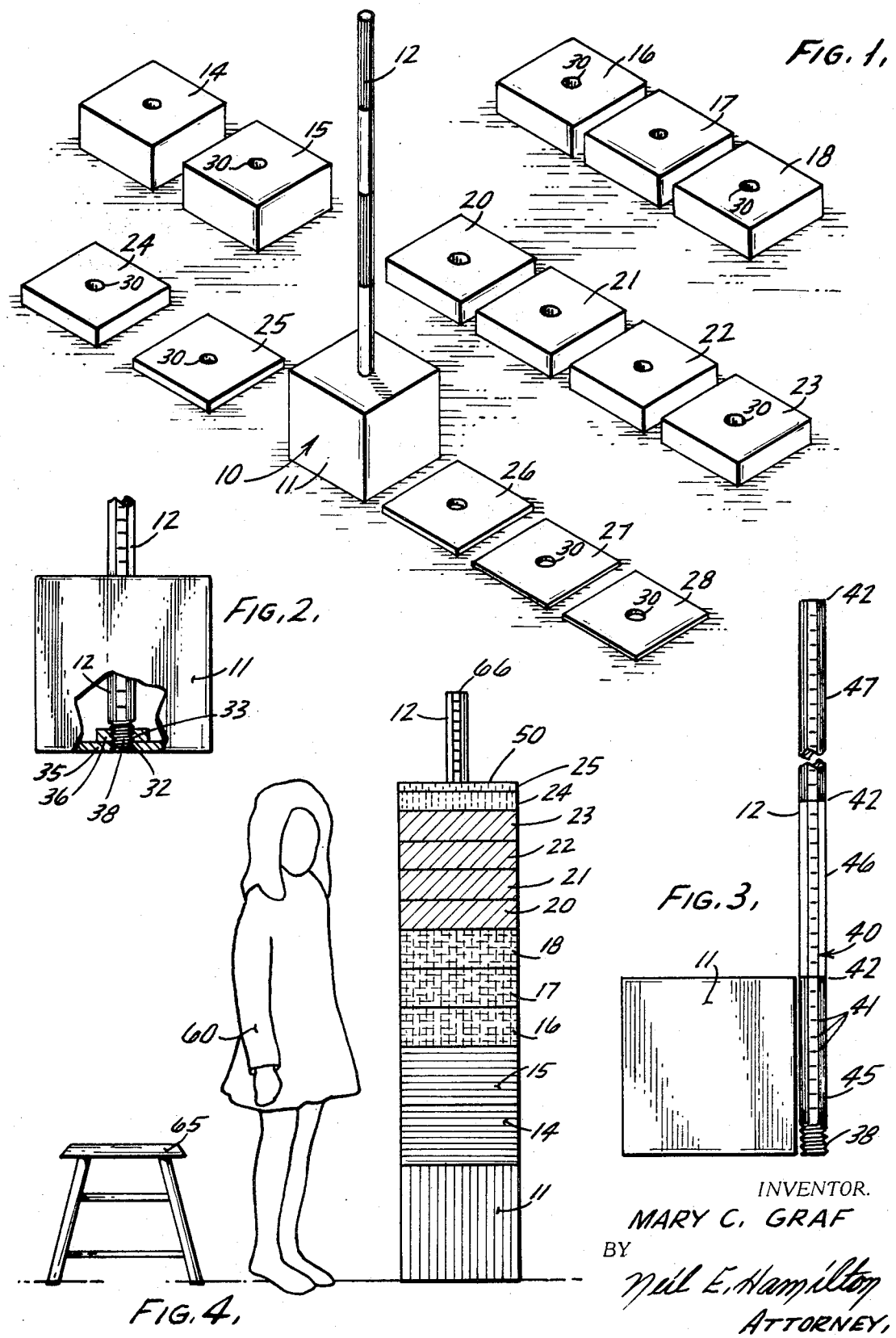

3,708,892

EDUCATIONAL DEVICE

BACKGROUND OF THE INVENTION

This invention relates to an educational device for children and more particularly, to a device wherein blocks of varying sizes and colors are supported on a post and a base in order to enable a child to visualize dimensional relationships with respect to the various sizes of blocks as well as to his own height. Educational devices with the type considered with in this invention are described in U.S. Pat. No. 2,486,260; 2,564,976; 3,302,311 and 3,208,162. U.S. Pat. No. 3,486,260 describes an educational appliance wherein blocks with openings are placed over the posts with numbers to teach a child addition by showing the number of blocks he has placed on the post. An educational device illustrating the decimal system is described in U.S. Pat. No. 3,564,976 whereas in U.S. Pat. No. 3,302,311 an educational game is described wherein blocks are placed over a series of posts with varying designs on the blocks in order for the child to create various patterns. A square and cube root demonstrator is shown in U.S. Pat. No. 3,208,162 wherein rectangles and blocks of varying proportional dimensions are provided to enable a student to visualize the square and cube root of a particular number. The prior art nowhere teaches an educational device wherein a child can be taught measurement including proportional relationships by means of various sizes of blocks and can do so in relation to his own height. The educational device of the present invention has the added advantage of training the child to measure by means of a removable post member and the size of the particular blocks are designed in sets so as to teach the student fractional amounts. To aid the student in seeing the proportional relationships, various color combinations and sets of blocks are utilized.

It is an object of the present invention to provide an educational device which permits a student to readily grasp measurement and mathematical relationships. It is another object of this invention to provide a teaching device which is three dimensional in construction and permits the student to see and comprehend linear as well as cubic concepts. It is still another object of the present invention to provide an educational device wherein a student can learn fractional amounts by placing groups of blocks of pre-selected dimensions in a side by side comparison as well as utilizing these blocks to measure himself to better grasp linear measure. It is yet another object of this invention to provide an educational device which is economically constructed yet is rigid and sturdy enough to be manipulated by any child.

SUMMARY OF THE INVENTION

The foregoing objects are accomplished and the shortcomings of the prior art are overcome by the present educational device which is comprised of a base member of a pre-determined dimension which supports a removable post member over which are placed various sizes of blocks having various color combinations. The blocks are colored in groups and are divided dimensionally to coincide with the base member as being a whole unit. The post member is removable and also has measuring indicia thereon to permit a child to measure the blocks as well as providing a means of supporting the blocks and measuring himself with respect to them. The post element is color coordinated to the blocks so as to aid the child in the correct placement of the blocks on the post.

BRIEF DESCRIPTION OF DRAWING

A better understanding of the present educational device will be accomplished by reference to the drawing wherein:

FIG. 1 is a perspective view of the educational device illustrating the post element supported by a base, and several block members lying horizontally.

FIG. 2 is a partial view in side elevation of the post element with a portion of the base broken away to show the manner of securing the post in the base.

FIG. 3 is a view in side elevation showing the post as a measuring means for the base.

FIG. 4 is a side elevational view of a child standing next to the post element with blocks placed on the post to correspond to the same height as the child and also indicating a storage means for the blocks.

DESCRIPTION OF THE PREFERRED EMBODIMENT

Proceeding to a detailed description of the present invention the educational device generally 10 is comprised of a base block member 11 from which extends a post element 12. Several block members indicated by the numbers 14, 15; 16, 17 and 18; 20, 21, 22 and 23; 24; 25; 26; 27 and 28 each have a central opening 30 through the blocks and is of sufficient size to permit the blocks to be coaxially positioned over and on post element 12. All of the blocks have the same horizontal dimension in that they are one foot square. In depth, base block 11 is one foot to form a cubic foot whereas blocks 14 15 are each six inches in depth. Base block 11 is red in color whereas blocks 14 and 15 are colored blue. A series of yellow blocks 16, 17 and 18 are each four inches in depth whereas blocks 20, 21, 22 and 23 are painted green and are each three inches in depth. It will be noted that blocks 14 and 15; 16–18 and 20–23 are colored in sets with the blocks in the sets having the same depth, or vertical dimension. These blocks when placed together according to their color form one cubic foot as does base block 11. A single block is represented by numeral 24 which is orange in color and measures two inches in depth whereas block 25 is purple and is one inch in vertical dimension. Two violet slabs 26 and 27 are one-half inch in depth and the remaining slab 28 is pink and measures one-quarter inch in depth.

As best shown in FIG. 2, post element 12 is centrally and threadably supported in square base block 11 by means of internal threads 32 and 33 in the floor wall 35 of block 11 and in support member 36 with corresponding external threads 38 on post element 12. Post element 12 is positioned to extend in a perpendicular manner upwardly from block 11.

Turning to FIG. 3, it will be seen that post element 12 is removed from base block 11 and is provided with measuring indicia generally 40 such as inches 41 and feet 42. It should also be noted that the post element or pole 12 is colored in one foot sections 45, 46 and 47 so that a child can coordinate the color grouped blocks such as 14 and 15 and 16–18 to equal one foot.

In FIG. 4, blue blocks 14 and 15; yellow blocks 16–18; green blocks 20–23; the orange block 24 and a purple block 25 are shown placed on post 12 and all resting on base block 11. The upper surface 50 of top block 25 corresponds to the height of a child 60. A foot stool 65 is provided to enable the child 60 to reach the top 66 of post 12 to place the blocks over and on it either for storage or for measuring.

OPERATION

A better understanding of the advantages of the educational device 10 will be had by a description of its operation which will be in two phases and will be in terms of explanation to a child with a mentality of three to six years.

Phase I — Invite a child 60 to join you with the post element 12 secured in base 11 and the blocks 14 and 15; 16–18; 20–23; 24; 25; 26; 27 and 28 all removed from pole 12. Preferably two rugs (not shown) should be obtained and placed on both sides of base block 11. Next, the child should be asked to unscrew the measuring pole 12 and permit her to solve the problem of reaching the top 66 of the pole. One should help her in this regard by suggesting that she obtain a nearby stool 65. Permit the child 60 to stand on stool 65 and tell her to unscrew the pole, counterclockwise. If the child asks what this means tell her it is the opposite direction that the clock moves. This could be shown concretely if there is a clock in the vicinity. After the pole 12 is unscrewed, it should be placed very gently and without a sound horizontally in front of base block 11 with the tape or measuring indicia side down. Show the child how to transfer the blocks one by one very softly to both sides of block 11 on the rugs. Have the child run her fingers along the sides of the blocks to get the feeling of the 12 inches by 12 inches sides. Next, place each block so that each piece touches the other and the sides are in alignment. (FIG. 1). First transfer the pink block or slab 28, then the two violets 26 and 27, the purple 25 and then the orange block 24 to the left of the red base, cubic block 11. Then place quietly, one by one, each green block or box 20, 21, 22 and 23 to the far right of the red cube 11, next place the yellow blocks 16, 17 and 18 gently beside the green boxes 20–23 and then position the blue blocks 14 and 15 all in alignment on top of each other with their colors matched and all their sides touching the red cube 11. Now, one can point to the fact that the red box or block 11, the grouped blue blocks 14 and 15; the grouped yellow blocks 16, 17 and 18 and the grouped green blocks 20, 21, 22 and 23 are all the same height.

Next, the measuring pole 12 is taken in hand and the number of inches 41 on the pole counted to the child. The number of inches should be explained such as 12 inches make 1 foot and 1 foot is 12 inches. Have the child say that 12 inches make 1 foot. It is then suggested to the child to see how many inches high the red cube 11 is and that if it is 12 inches then it is 1 foot. Let the child take the pole 12 and discover this fact. This is as shown in FIG. 3.

Now let her measure all the colored blue, yellow and green blocks 14 and 15; 16–18 and 20–23, respectively, to discover that they are all 12 inches and the same height when placed together in corresponding colored groups. The child 60 can then measure the orange block 24 to find that it is 2 inches high and the purple slab is 1 inch. She can also measure the two violet blocks 26 and 27 to find that they are 1 inch each in height and equal to the purple block 25. She can measure the two violet slabs 26 and 27 in order to verify that they are one inch thick and the same as the purple slab 25. (The pink one-quarter inch block 28 can wait until later when the child has learned the concept of the fraction ¼ through working with the four green boxes 20, 21, 22 and 23).

The next step is to ask the child to measure the sides of the red cube 11. She will find them 12 inches each and you can say all of the sides are exactly the same, i.e., they are 12 inches each. Run your index finger under the symbols which is preferably written on the red cubic block 11 (not shown) and say 12 inches makes 1 foot. You can point to the abreviation for inches (") and say (") means inches, which can also be written on cube 11. Similarly, you can point to a foot mark (') and say (') means foot or feet. Then tell the child that each side is a foot long and this is a cube. It is a cube with all the sides measuring 1 foot. One calls this red block 11 one cubic foot. As you say that, you can run your index finger under a phrase one cubic foot which can be written on the red cubic foot. One can put their hand on each cubic foot and say, the two blue boxes 14 and 15 make one cubic foot, the three yellow boxes 16, 17 and 18 make a cubic foot and the four green boxes 20, 21, 22 and 23 make a cubic foot. The child may gently place the yellow boxes 16–18 on top of the blue 14 and 15 and the green 20–23 on top of the yellow and say that this makes 3 feet. You can also (with the measuring pole 12 again) point out that the height of the red box 11 is 12 inches which makes 1 foot and the height of the blue boxes 14 and 15 is 12 inches and the height of the yellow boxes is 12 inches. Pointing to the cubic foot say 1 foot and 1 foot is 2 feet high and 2 feet and 1 foot is 3 feet high. Depending on the height of the child one may add two green boxes 20 and 21 and the purple slab 25 and have 3 feet 7 inches. These boxes would be added on top of the red box 11 and measured as indicated in FIG. 3. Allow the child to differentiate between which boxes to use in order to find her height. When she has guessed accurately enough, the measuring pole 12 can be placed across the top of the top box to find if the child's head touches the pole. Boxes may be added or subtracted to have the head just touch the pole. The child can be measured exactly as there is the one quarter inch pink square slab 28. One might allow the child to write down her height. She should also be taught the meanings of the symbols inches and feet. Later one can make a graph in class of all the children's heights with each child coloring their own bar indicating their height.

Another manner of utilizing the measuring capabilities of educational unit 10 is to permit the child 60 to stand next to the pole 12 as screwed into box 11 and allow her to place blocks such as 14, 15, 16, 17, 18, 20, 21, 22, 23, 24 and 25 onto pole 12 by means of stool 65 until the upper surface 50 is level with the top of her head. This is shown in FIG. 4 and would indicate a height of four feet three inches.

A final step is for the child to put away her work. The pole 12 will indicate by color code 45, 46 and 47 where the colors of blocks belong. The child will screw the pole 12 into box 11 and gently slip the boxes over and down the pole 12. First she will slip on the blue boxes, yellow boxes, green boxes, orange slab, purple slabs and pink square, as generally indicated in FIG. 4.

Phase II — With the blue boxes 14 and 15, the yellow ones 16–18 and the green boxes 21–23 placed together horizontally and stacked in their color groups one would point out to the child the fact that the red cube 11, the blue cube 14, the yellow cube 16 and green cube 20 are exactly the same size. One should run their hands down the sides of the red cube 11 to feel that it is whole. The child should be invited to feel it with both hands also. Next run your hands down the sides of the blue boxes 14 and 15 and cause to feel the partition. Allow the child to do the same. Slide the top blue box off and place it gently along the side of the bottom half. Run your hand down along the sides of each blue box 14 and 15 saying, "This is one half and this is one half." Now slide the top blue box on top again and say, "Now it is a whole cube." The same procedure would be followed regarding the yellow cubes 16–18 and the green cubes 20–23 divided into thirds and fourths. One can teach the terms of one-half, one-third, and one-fourth in a three period lesson. At another lesson, one can teach the child the fractional symbols ½, ⅓ and ¼. A child can learn that 2/4 is ½ or ⅓ and ⅓ = ⅔. One can learn that 2/4 and ½ when added together are as whole. One can learn the symbols ¾, ⅔, etc. One can compare the sides of the whole red cube 11, one blue cube 14, one yellow 16 and one green 20. A child can also build very artistic, creative structures by mixing and fixing the boxes. For example, by diagonally placing on top each other, green 20, yellow 16, green 21, yellow 17, green 22, yellow 18 and green 23.

It will be seen that the educational device 10 is in effect comprised of a reference block member 11 having preselected, uniform, vertical and horizontal dimensions which also serves as a support for pole 12. If desired, a standard base type pedestal foot group can be used to support pole 12 in a vertical manner and block 11 placed over the support for purposes of storage or measurement. Further, while several blocks of various color combinations have been employed some of the advantages of the device 10 could be accomplished with a single block such as 14, 20 or 16 or a number less than shown. However, it is important that whether a single block or more is utilized, that it have the same uniform horizontal dimension as the reference block but be of a different color and a uniformly vertical dimension different than the vertical dimension of the reference block and of a pre-selected proportional dimension of the vertical dimension.

The preferred materials for fabricating the post element 12, the base member 11, and the blocks 14, 15, 16–18, 20–23, 24, 25, 26, 27 and 28 is wood. In the instance of blocks 14, 15, 16–18 and 20–23 they are formed from boxes fabricated from wood whereas in the instance of the remaining blocks they are merely slabs of wood which are cut to dimension. If desired, other materials and combinations thereof can be substituted such as aluminum could be used for the pole and a resinous plastic which is rigid or semi-rigid could be employed to form the base and the block members. In any event, if paint or plastic is employed it should be of a non-toxic nature.

While the preferred manner of dimensioning the base and the blocks is in the measurement of one foot with other blocks being scaled thereto, if desired, the base could be of another unit measurement or could be two inches with all the other blocks being scaled to inches rather than in terms of feet and inches. Similarly, while the British system has been utilized for showing mathematical relationships in the various blocks and base members, if desired, the metric system could be employed by having the base member one meter and the remaining boxes represent portions of the meter including centimeters. A further use of the present educational device would be in showing relationships between the British and the metric systems wherein certain blocks or the pole would be in one system and the other blocks in the other system as a means of comparison.

It will thus be seen that through the present invention, there is now provided a device which while simple in its construction yet is highly effective in introducing someone to measurement whether it be in terms of inches, feet and cubic feet or in terms of the decimal system. The unit also affords an introduction to solid geometry as parts of a whole may be divided as well as an acquaintance with fractions and their symbols. A visual discrimination of difference in dimensions as well as a concentration of an appreciation for beauty in design by means of colors is also afforded with a consequent development of creativity. The educational device of this invention prepares a child for addition, subtraction, multiplication and division. It also serves as a converting means for showing relationship of inches into feet and feet into inches as well as a foot into a yard. A sense of turning to fasten and loosen objects is also afforded.

Further, younger children can learn decreasing dimension and the meaning of the words thick, thicker and thickest; thin, thinner, thinnest; tall, taller, tallest as well as the primary colors. Beauty in dimensions and colors by arranging and building is also taught.

As the materials employed in the present invention are very economical the present unit is inexpensive to manufacture yet will not require a high degree of care. The design of the unit lends itself to sturdy construction and thus it will withstand much abuse.

The foregoing invention can now be practiced by those skilled in the art. Such skilled persons will know that the invention is not necessarily restricted to the particular embodiments presented herein. The scope of the invention is to be defined by the terms of the following claims as given meaning by the preceding description.

I claim:

1. An educational device comprising a supporting base, reference block member, a post element adapted to be secured to and supported by said reference block member, said reference block member having preselected, uniform, vertical and horizontal dimensions, at least one additional block member being of substantially the same and uniform horizontal dimension as said reference block member but being of a different color than said reference block member and a uniformly vertical dimension different than the vertical dimension of said reference block member and of a pre-selected proportional dimension of said vertical dimension of said reference block member, said additional block member constructed and arranged with an opening through said block member to coaxially position said block member on said post element, said post element including measuring indicia for measuring said reference block member and said additional block.

2. The educational device as defined in claim 1 wherein said reference block member and at least some of said additional block members are formed from hollow wooden boxes.

3. The educational device as defined in claim 1 wherein said post element is removably secured to said reference block member in a threaded manner.

4. The educational device as defined in claim 1 wherein said post is of a height to correspond in measurement to the height of a child.

5. The educational device as defined in claim 1 wherein said reference block member and said additional block member are substantially square in horizontal dimension.

6. The educational device as defined in claim 1 further including a multiplicity of block members with at least some of the block members constructed and arranged in sets having the same vertical dimension and color and proportioned to equal the vertical dimension of said reference block member.

7. The educational device as defined in claim 6 further including single block members each having an independent color and vertically dimensioned and proportioned to said reference block member and to each said other additional block member.

8. The educational device as defined in claim 7 wherein the British system of measurement is employed to dimension said blocks and said reference block member is dimensioned to form one cubic foot with said blocks vertically dimensioned to compositely form one cubic foot or a fraction thereof.

9. The educational device as defined in claim 7 wherein said post element is color coordinated to the lateral dimensions of said blocks.

10. The educational device as defined in claim 7 including at least ten block members.

* * * * *